United States Patent
Berg et al.

(10) Patent No.: US 8,230,202 B2
(45) Date of Patent: *Jul. 24, 2012

(54) APPARATUS AND METHOD FOR CONDENSING TRACE INFORMATION IN A MULTI-PROCESSOR SYSTEM

(75) Inventors: Thomas Benjamin Berg, Portland, OR (US); Ryan C. Kinter, Seattle, WA (US); Jaidev Prasad Patwardhan, Sunnyvale, CA (US); Radhika Thekkath, Palo Alto, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 12/060,204

(22) Filed: Mar. 31, 2008

(65) Prior Publication Data

US 2009/0249045 A1  Oct. 1, 2009

(51) Int. Cl.
*G06F 9/30* (2006.01)

(52) U.S. Cl. ...................................... 712/227

(58) Field of Classification Search ......... None
See application file for complete search history.

(56) References Cited

U.S. PATENT DOCUMENTS

| | | |
|---|---|---|
| 5,978,926 A | 11/1999 | Ries et al. |
| 6,092,187 A | 7/2000 | Killian |
| 6,425,076 B1 | 7/2002 | Killian |
| 6,493,637 B1 | 12/2002 | Steeg |
| 6,625,737 B1 | 9/2003 | Kissell |
| 6,785,773 B2 | 8/2004 | Farago et al. |
| 6,976,178 B1 | 12/2005 | Kissell |
| 7,043,668 B1 | 5/2006 | Treue et al. |
| 7,055,070 B1 | 5/2006 | Uhler et al. |
| 7,065,675 B1 | 6/2006 | Thekkath et al. |
| 7,069,544 B1 | 6/2006 | Thekkath |
| 7,124,072 B1 | 10/2006 | Thekkath et al. |
| 7,134,116 B1 | 11/2006 | Thekkath et al. |
| 7,159,101 B1 | 1/2007 | Thekkath et al. |
| 7,168,066 B1 | 1/2007 | Thekkath et al. |
| 7,178,133 B1 | 2/2007 | Thekkath |
| 7,181,728 B1 | 2/2007 | Thekkath |
| 7,185,234 B1 | 2/2007 | Thekkath |
| 7,194,599 B2 | 3/2007 | Hudepohl et al. |
| 7,219,333 B2 | 5/2007 | Agarwala et al. |
| 7,231,551 B1 | 6/2007 | Treue et al. |
| 7,237,090 B1 | 6/2007 | Hudepohl et al. |
| 7,246,287 B1 | 7/2007 | Chua-Eoan et al. |
| 7,287,147 B1 | 10/2007 | Hudepohl et al. |

(Continued)

FOREIGN PATENT DOCUMENTS

WO  PCT/US2009/037247  5/2009

(Continued)

OTHER PUBLICATIONS

Wikipedia "MESI protocol" article. Mar. 11, 2008. 3 pages.*

(Continued)

*Primary Examiner* — Robert Fennema

(74) *Attorney, Agent, or Firm* — Cooley LLP

(57) ABSTRACT

A computer readable storage medium includes executable instructions to characterize a coherency controller. The executable instructions define ports to receive processor trace information from a set of processors. The processor trace information from each processor includes a processor identity and a condensed coherence indicator. Circuitry produces a trace stream with trace metrics and condensed coherence indicators.

26 Claims, 5 Drawing Sheets

U.S. PATENT DOCUMENTS

| | | |
|---|---|---|
| 2003/0046610 A1 | 3/2003 | Yamamoto et al. |
| 2004/0148550 A1 | 7/2004 | Swoboda |
| 2004/0153813 A1 | 8/2004 | Swoboda |
| 2004/0210721 A1 | 10/2004 | Detjens et al. |
| 2006/0053323 A1 | 3/2006 | Kissell |
| 2006/0184837 A1 | 8/2006 | Al-Omari |
| 2006/0225050 A1 | 10/2006 | Thekkath |
| 2006/0259703 A1 | 11/2006 | Sohm et al. |
| 2006/0259831 A1 | 11/2006 | Sohm et al. |
| 2007/0089095 A1 | 4/2007 | Thekkath et al. |
| 2007/0180327 A1 | 8/2007 | Thekkath |
| 2007/0180333 A1 | 8/2007 | Thekkath |
| 2007/0294592 A1 | 12/2007 | Ashfield et al. |
| 2008/0022173 A1 | 1/2008 | Chua-Eoan |
| 2008/0320232 A1* | 12/2008 | Vishin et al. .................. 711/143 |
| 2008/0320233 A1* | 12/2008 | Kinter ........................... 711/143 |
| 2009/0083493 A1 | 3/2009 | Kinter |

FOREIGN PATENT DOCUMENTS

WO  PCT/US2009/038745    5/2009

OTHER PUBLICATIONS

Office Actions mailed Sep. 22, 2010 and Feb. 15, 2011. Berg et al., U.S. Appl. No. 12/060,214, filed Mar. 31, 2008.

Office Action mailed Sep. 14, 2011. Berg et al., U.S. Appl. No. 12/060,214, filed Mar. 31, 2008.

* cited by examiner

APPARATUS AND METHOD FOR CONDENSING TRACE INFORMATION IN A MULTI-PROCESSOR SYSTEM

CROSS-REFERENCE TO RELATED APPLICATION

This application is related to the commonly owned and concurrently filed application entitled "Apparatus and Method for Low Overhead Correlation of Multi-Processor Trace Information", Ser. No. 12/060,214, filed Mar. 31, 2008.

FIELD OF THE INVENTION

This invention relates generally to processing trace information to identify hardware and/or software problems. More particularly, this invention relates to compact trace formats for utilization in a multi-processor environment.

BACKGROUND OF THE INVENTION

The PDTrace™ architecture refers to a set of digital system debugging methodology and its implementations available through MIPS Technologies™, Inc., Mountain View, Calif. The PDTrace™ technology is described in U.S. Pat. Nos. 7,231,551; 7,178,133; 7,055,0707 and 7,043,668, the contents of which are incorporated herein by reference.

Current PDTrace™ technology supports single processor systems. It would be desirable to extend PDTrace™ technology to support multi-processor systems.

Time stamps or other high overhead techniques may be used to organize trace information from multiple processors. However, this results in voluminous information and large computational demands. Similarly, tracing information in a multi-processor system may result in information overload and long processing times.

Therefore, it is desirable to condense the amount of information to be processed, while still providing adequate information to support meaningful debugging operations. Ideally, different trace formats would be provided depending upon debugging requirements. In addition, an efficient technique to correlate information from different trace streams is desirable to reduce information bandwidth and processing times.

SUMMARY OF THE INVENTION

A computer readable storage medium includes executable instructions to characterize a coherency controller. The executable instructions define ports to receive processor trace information from a set of processors. The processor trace information from each processor includes a processor identity and a condensed coherence indicator. Circuitry produces a trace stream with trace metrics and condensed coherence indicators.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
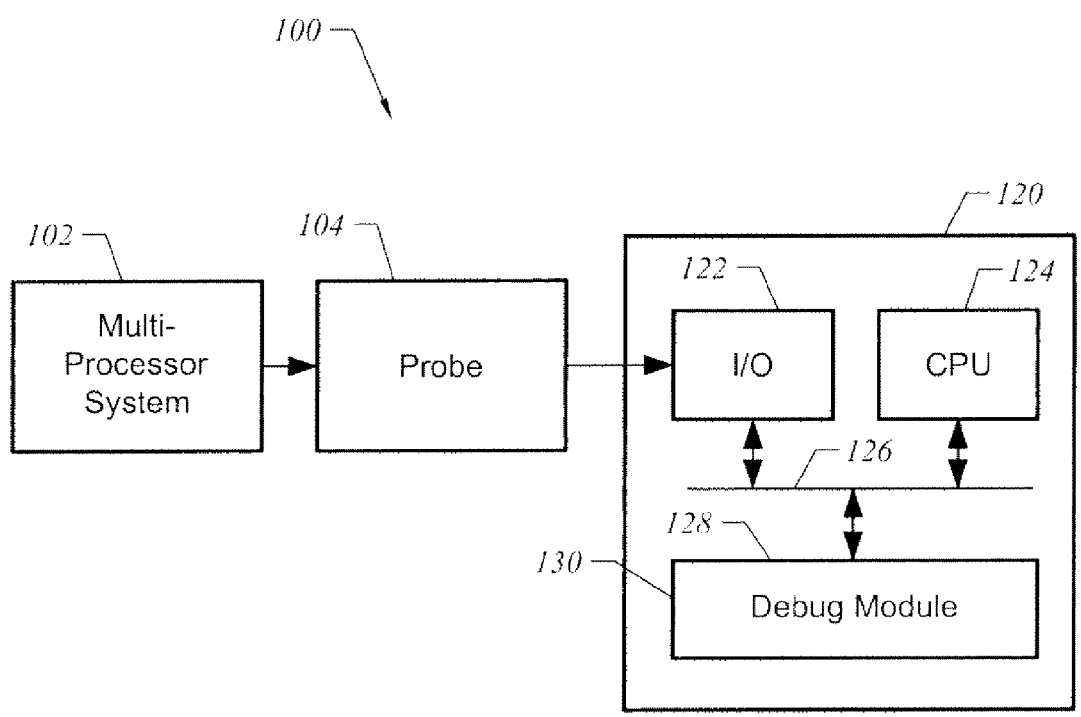
FIG. 1 illustrates a system configured in accordance with an embodiment of the invention.

FIG. 1 illustrates a system 100 configured in accordance with an embodiment of the invention. The system 100 includes a multi-processor system 102. The multi-processor system 102 includes multiple processors either on a single semiconductor substrate or multiple semiconductor substrates linked by interconnect (e.g., a printed circuit board). A probe 104 receives trace information from the multi-processor system 102 and conveys it to a computer 120. The probe 104 may perform initial processing on the trace information, temporarily store selected trace information and perform other probe operations known in the art.

The computer 120 includes standard components, such as input/output devices 122 connected to a central processing unit 124 via a bus 126. A memory 128 is also connected to the bus 126. The memory 128 includes a debug module 130, which includes executable instructions to debug trace information from multiple processors. The debug module 130 includes executable instructions to process condensed coherence indicators of the invention to isolate individual trace streams associated with individual processors. The debug module 130 also includes executable instructions to process trace metrics, processor identifiers and various information in PDTrace™ technology trace formats, as discussed below. The debug module 130 also includes executable instructions to evaluate interactions between processors, as indicated in the traced information.

Figure 2:
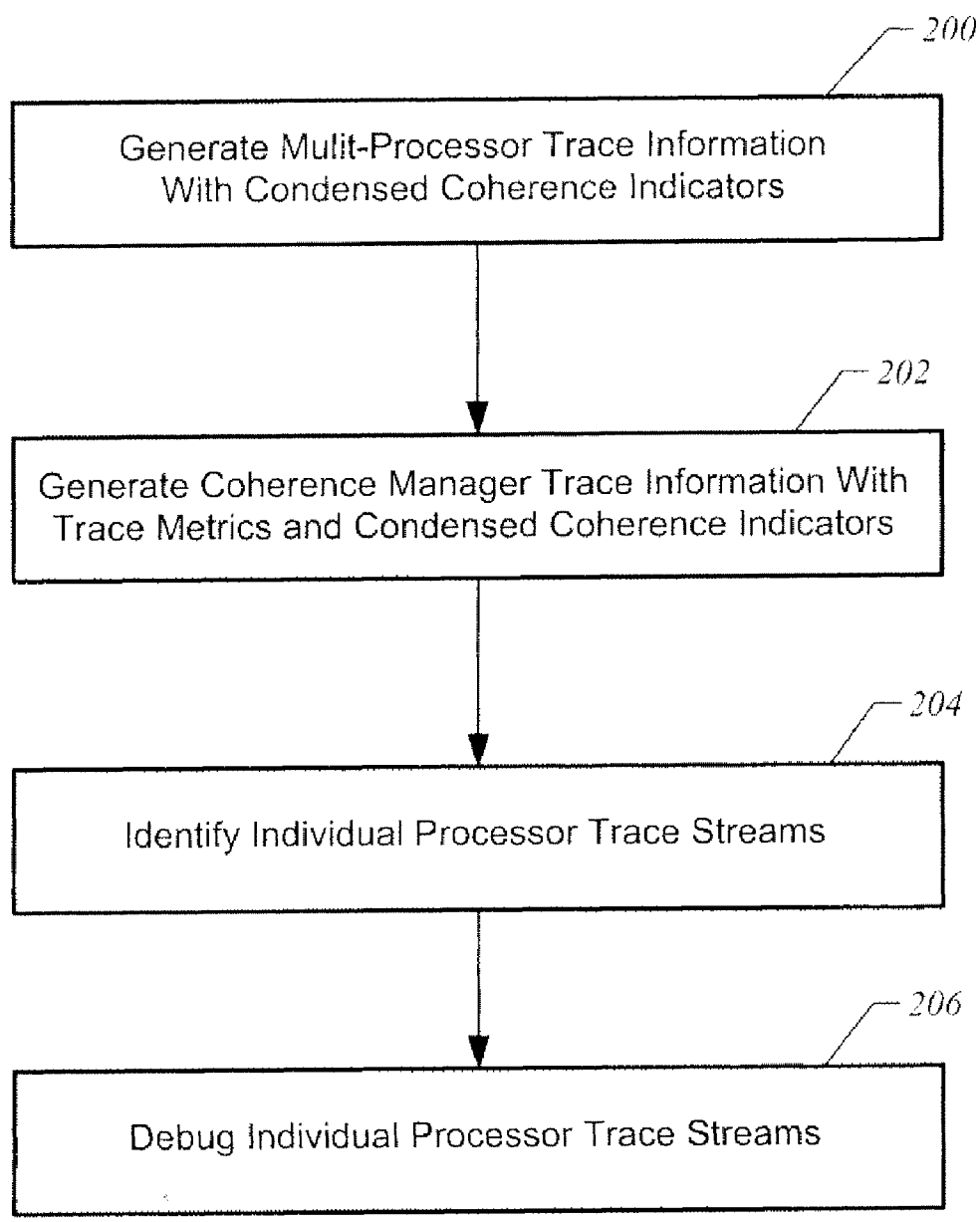
FIG. 2 illustrates processing operations associated with an embodiment of the invention.

FIG. 2 illustrates processing operations associated with the system 100. Initially, multi-processor trace information with condensed coherence indicators is generated 200. As discussed below, each processor generates a coherence indicator that demarks selective shared memory transactions within the multi-processor system. The coherence indicator may be derived as a function of a processor synchronization signal and a shared memory miss signal, as discussed below. In one embodiment, the condensed coherence indicator is a two-bit value to synchronize core trace messages with trace messages received from a coherence manager.

The next operation of FIG. 2 is to generate coherence manager trace information with trace metrics and condensed coherence indicators 202. The multiple processors of the multi-processor system communicate with a coherence manager that generates the coherence manager trace information, as discussed in connection with FIG. 3. The multi-processor trace information combined with the coherence manger trace information can be used to analyze the interaction of transactions from different processors. This analysis can aid debugging hardware and/or software problems.

Individual processor trace streams can be identified 204. For example, the debug module 130 may process core trace messages and trace messages from the coherence manager to recreate an accurate execution trace. The coherence indicators of the core trace messages are correlated with the coherence indicators of the coherence manager trace information to identify individual trace streams.

Once individual trace streams have been identified, individual trace streams may be debugged 206. In particular, the individual trace streams may be debugged for hardware and/or software problems. Information in individual trace streams allows one to debug interactions between the individual processors of the multi-processor system.

Figure 3:
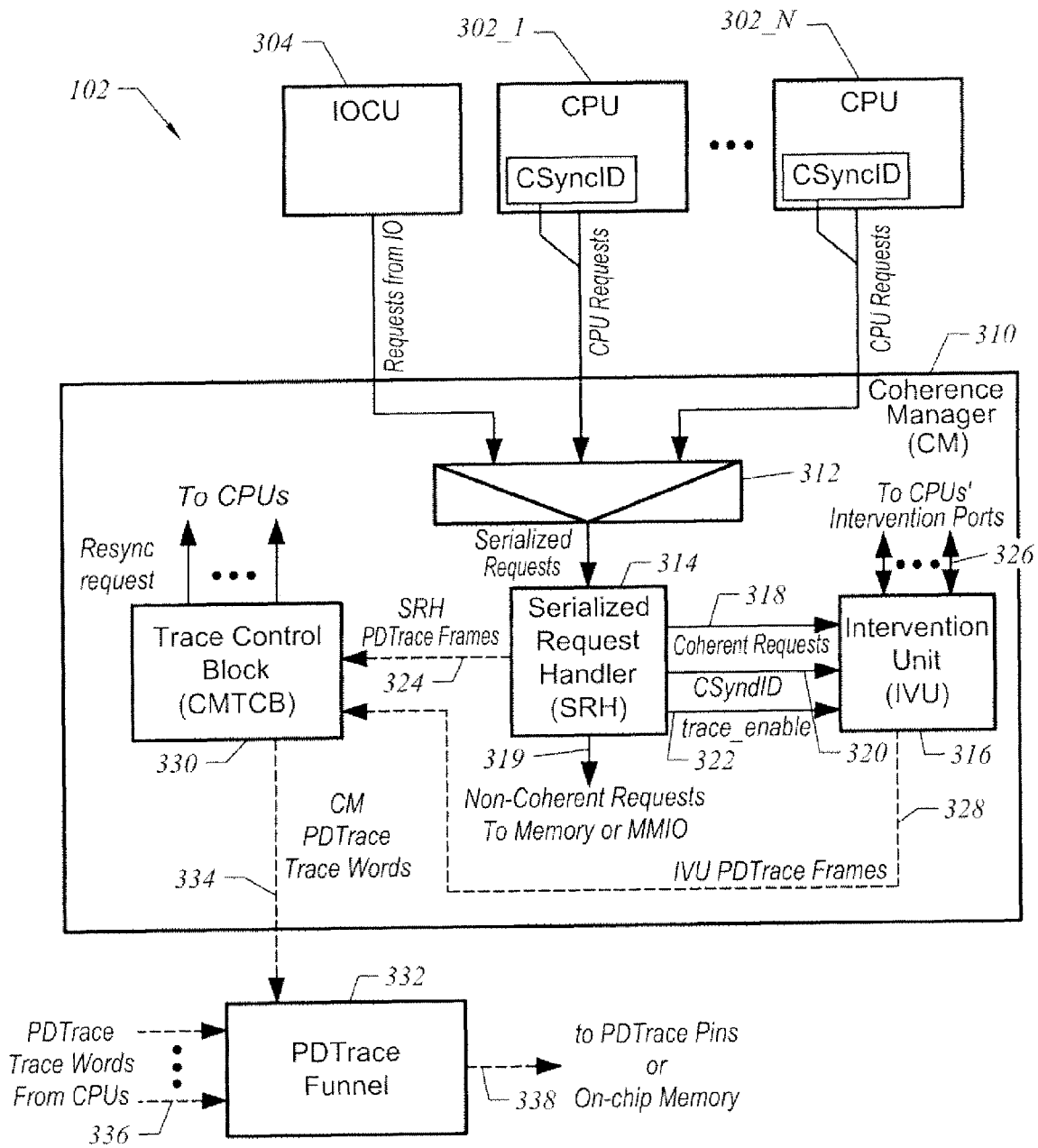
FIG. 3 illustrates a coherence manager configured in accordance with an embodiment of the invention.

FIG. 3 illustrates a multi-processor system 102 configured in accordance with an embodiment of the invention. The multi-processor system 102 includes individual processors 302_1 through 302_N. Each processor is configured to produce core trace information and a condensed coherence indicator. In one embodiment, the core trace information adheres to PDTrace™ technology trace formats. In one embodiment, the condensed coherence indicator is a two-bit value that demarks selective shared memory transactions. The condensed coherence indicator is typically accompanied by a processor identifier. The combination of a processor identifier and a condensed coherence indicator allows individual trace streams to be identified in the multi-processor system.

The multi-processor system 102 may also include an input/output coherence unit 304 to process requests from input/output units (not shown). Traffic from the processors 302 and input/output coherence unit 304 is applied to a coherence manager 310. The coherence manager 310 queues, orders and processes all memory requests in the multi-processor system. The processors of the multi-processor system communicate with one another through shared memory regions. The coherence manager 310 serializes memory operations and provides global ordering of memory operations.

The coherence manager 310 includes a circuit 312 to serialize requests. Serialized requests are then processed by the serialized request handler 314. The serialized request handler 314 provides global transaction ordering. More particularly, the serialized request handler 314 interprets and routes each request to a memory interface, a memory mapped input/output interface or the intervention unit 316.

The serialized request handler 314 routes coherent requests to the intervention unit 316, as shown with arrow 318. Non-coherent requests to memory or memory mapped input/output are also controlled by the serialized request handler 314, as shown with arrow 319. The serialized request handler 314 also sends a coherence indicator to the intervention unit 316, as shown with arrow 320. The coherence indicator is periodically referred to herein as "COSID or "CSyncID". A trace enable signal is also applied to the intervention unit 316 from the serialized request handler 314, as shown with arrow 322. This signal helps the intervention unit identify transactions that are traced by the serialized request handler. This in turn enables the intervention unit to only trace transactions traced by the serialized request handler. The serialized request handler can selectively trace transactions based on control register settings. The serialized request handler 314 produces serialized request handler trace frames, as shown with arrow 324.

As previously indicated, the coherence manager 310 also includes an intervention unit 316. The intervention unit 316 sends coherent requests to processors, collects responses to requests and takes specified actions. The intervention unit 316 also provides intervention cache state for each transaction. The intervention ports 326 of the intervention unit 316 service coherence requests from processors that can affect the state of local cache lines. The intervention unit 316 generates intervention unit trace frames, as shown with arrow 328.

The serialized request handler trace frames and the intervention unit trace frames are processed by a coherence manager trace control block 330. The coherence manager trace control block 330 processes the serialized request handler trace frames and the intervention unit trace frames to produce trace words, which are sent to a trace funnel 332, as shown with arrow 334. The trace funnel 332 receives trace words from the processors 302, as shown with arrows 336. The funnel 332 interleaves trace words from the processors and the coherence manager 310. The resultant trace stream is applied to trace pins of a probe or is stored in on-chip memory, as indicated with arrow 338.

If the serialized request handler 314 or the intervention unit 316 produces a trace message, but it cannot be accepted by the trace control block 330 and the Inhibit Overflow bit in the trace control block control register is 0, then an overflow occurs and the message is dropped. At this point, the serialized request handler 314 and intervention unit 316 stop tracing. All transactions that are pending in the intervention unit 316 that have not been traced will not be traced (i.e., the trace enable bit associated with that transaction is cleared). The trace control block 330 then waits until all trace words in its FIFO have been accepted by the trace funnel 332. At that point, the resynchronization signal is asserted to all processors and the serialized request handler 314 and the intervention unit 314 are allowed to start tracing messages again (assuming that trace is still enabled via the trace control registers).

Figure 4:
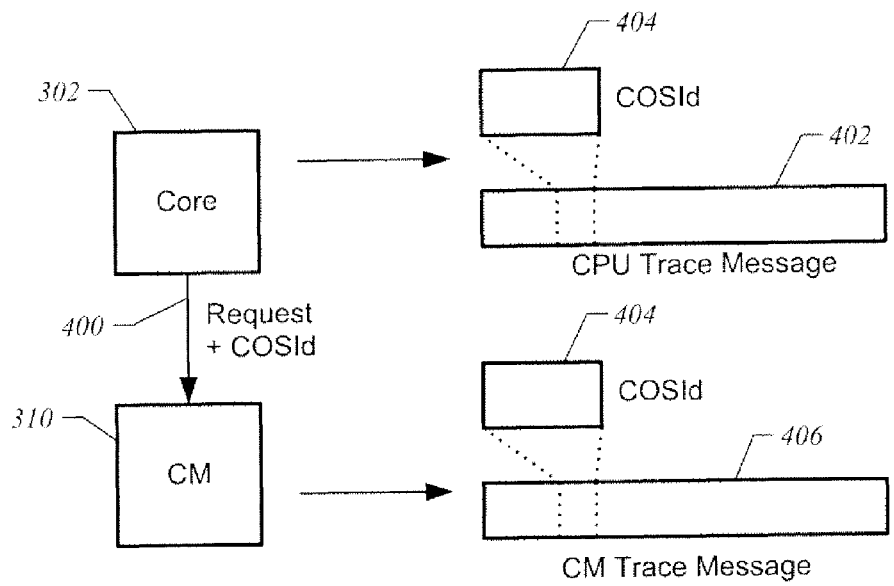
FIG. 4 illustrates the use of a condensed coherence indicator by a processor and a coherence manager in accordance with an embodiment of the invention.

FIG. 4 illustrates a single processor 302 and the coherence manager 310. The processor 302 passes a request and a coherence indicator to the coherence manager 310, as indicated with arrow 400. The core 302 also produces a processor or core trace message 402, which includes the coherence indicator 404 (i.e., COSId). The processor trace message 402 includes information on the internal pipeline activities of the processor.

The coherence manager 310 produces a coherence manager trace message 406, which includes the same coherence indicator 404. The coherence manager trace message 406 provides information on common memory port transactions. As discussed below, the coherence manager trace information includes trace metrics. Embodiments of the invention provide different formats for the trace metrics depending upon debugging requirements.

Using the coherence indicator 404, which is common to both the processor trace message 402 and the coherence manager trace message 406, the different types of trace messages may be correlated downstream, e.g., at the debug module 130. This is more fully appreciated in connection with FIG. 5.

Figure 5:
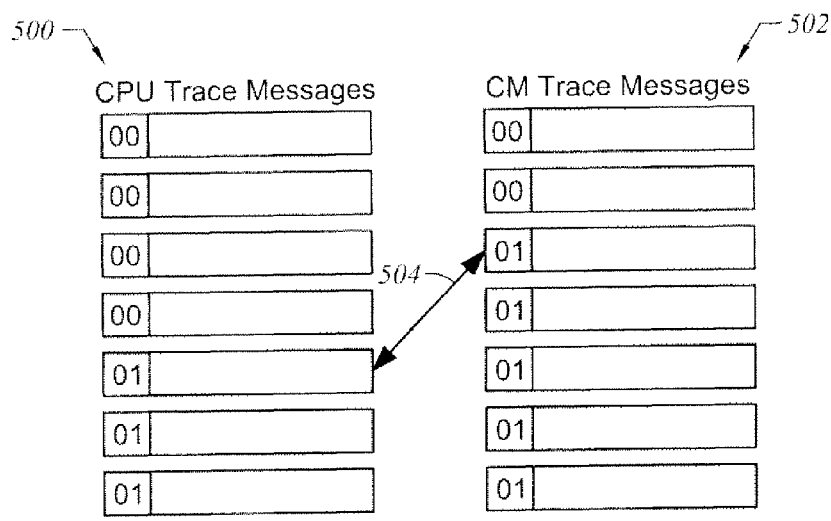
FIG. 5 illustrates the use of condensed coherence indicators associated with a processor and a coherence manager to correlate trace information in accordance with an embodiment of the invention.

FIG. 5 illustrates a set of processor trace messages 500 and coherence manager trace messages 502 from a single core. Each message includes a two bit condensed coherence indicator. In this example, the first four processor trace messages 500 include a condensed coherence indicator value of "00". The first two coherence manager trace messages include the same "00" value. The condensed coherence indicator value subsequently toggles to a "11" value. As indicated with arrow 504, the transitioning of the condensed coherence indicator demarks related trace events. Therefore, relying upon the transitioning of the condensed coherence indicator for a given processor, processor trace messages 500 and coherence manager trace messages 502 may be correlated. This functionality is more fully appreciate with reference to FIG. 6.

Figure 6:
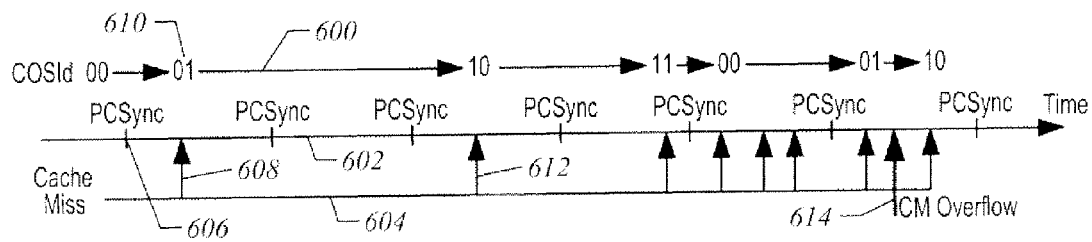
FIG. 6 illustrates the toggling of a condensed coherence indicator in accordance with an embodiment of the invention.

FIG. 6 illustrates three events with three separate horizontal lines 600, 602 and 604. The first event, line 600, is the toggling of the condensed coherence indicator value, in this case, a two bit value identified as COSId. The next event, shown with line 602 is the triggering of a processor synchronization value identified as PCSync. PCSync is an internal periodic synchronization mechanism used in the PDTrace™ technology. For every specified number of clock cycles (e.g., 1K cycles), a processor inserts a special synchronization frame into its trace stream. Trace processing software may use this synchronization frame to align its view of program execution. A synchronization frame may also be issued when a processor drops a trace frame due to a trace overflow within the processor and/or when a processor execution mode is altered.

The third line of FIG. 6, line 604, indicates cache miss events. Starting from left and moving to the right in FIG. 6, initially the coherence indicator value is "00". A synchronization signal 606 is then issued. After the next cache miss, indicated by arrow 608, the coherence indicator value 610 is incremented to the value "01". Subsequently, two synchronization signals are issued, but the coherence value is not incremented until the next cache miss, as indicated with arrow 612. Thereafter, a single synchronization signal is followed by a cache miss to increment the coherence indicator to "11". After the coherence indicator is cycled to "00", multiple cache misses occur before a synchronization signal. The coherence indicator increments after a combination of a synchronization signal and a cache miss, at this point resulting in a "01" value. A coherence manager overflow signal, indicated by arrow 614, operates as a synchronization signal, with the result that the coherence indicator is incremented with the next memory miss, as indicated with the value incrementing to "10".

Figure 7:
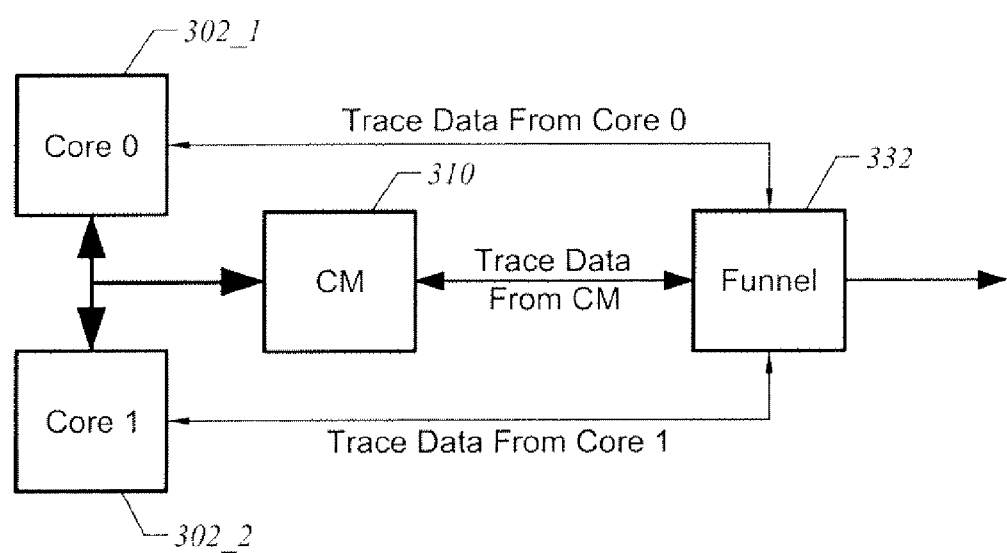
FIG. 7 illustrates the flow of trace information in accordance with an embodiment of the invention.

FIG. 7 illustrates a first processor core 302_1 providing first core trace data to a funnel 332 and a second processor 302_2 providing second core trace data to the funnel 332.

Each core also supplies information, including the coherence indicator, to the coherence manager 310. The coherence manager trace data includes a processor identifier and a coherence indicator. The processor identifier allows a module downstream of the funnel 332 (e.g., the debug module 130) to correlate each trace stream with each processor. Furthermore, the coherence indicator allows processor trace messages and coherence trace messages to be correlated.

The invention is more fully appreciated in connection with the following specific examples of an embodiment of the invention. The core specific trace signals associated with the PDTrace™ technology are compatible with the present invention. The only alteration required to these signals is to include a coherence indicator. In one embodiment, a two bit coherence indicator is used to synchronize core trace messages with trace messages received from the coherence manager.

The coherence manager 310 may be implemented to process a set of serialized request handler signals and a set of intervention unit signals. In one embodiment, the serialized request handler signals may include various trace metrics, including a source processor, a serialized command, stall information, the address of a request being processed, and a target address. The intervention unit signals may include various trace metrics, including a source processor, a bit vector of intervention port responses, a global intervention state for a cache line, a transaction cancelled indicator, an intervention that will cause a cancelled store condition to fail, an intervention that will cause a future store condition to fail, transaction delay information, and stall cause information. These signals are characterized in the tables below.

TABLE 1

Serialized Request Handler (SRH) and Intervention Unit (IVU) Signals

| Signal Name | Width | Description |
|---|---|---|
| SRH_SrcPort | 3 | Source of the request that was serialized. |
| SRH_COSId | 2 | Coherent Sync ID of transaction. Used to correlate CPU and Coherence Manager (CM) transactions. |
| SRH_MCmd | 5 | Command in the request that was serialized (See Table 2) |
| SRH_WaitTime | 8 | This is active only in timing mode. Tracks how many cycles the transaction spent stalled in the SRH. Saturates at 255 cycles. |
| SRH_Address | 29 | This is active when tracing addresses from the SRH - provides the address corresponding to the request being traced. |
| SRH_Addrtarg | 3 | Target of the current request (see Table 3). Indicates speculative reads as well. |
| IVU_COSId | 2 | Coherent Sync ID at the Intervention Unit. |
| IVU_SrcPort | 3 | The core that made the original request that resulted in this intervention. |
| IVU_RespBV | 6 | Bit vector of intervention port responses. Bit corresponding to a core is set to '1' if the intervention hit and set to '0' if the intervention missed. |
| IVU_IntvResult | 3 | Global Intervention State for this cache line (see Table 4). |
| IVU_SC_Cancel | 1 | This transaction was cancelled due to a previous store condition failure. |
| IVU_SC_Failed | 1 | This intervention will cause a future store condition to fail. |
| IVU_PIQ_WaitTime | 8 | Count the number of cycles each transaction spends at the top of the Pending Intervention Queue (PIQ). Saturates at 255 |
| IVU_PIQ_StallCause | 3 | The last reason this transaction was stalled on top of the PIQ. (see Table 5) |

TABLE 2

Serialized Commands

| Value | Command | Description |
|---|---|---|
| x00 | IDLE | |
| x01 | LEGACY_WR_UC | Uncached legacy write, CCA = Uncached (UC), Uncached Accelerated (UCA), Write Through (WT) |
| x02 | LEGACY_RD_UC | Uncached legacy read, CCA = UC |
| x03 | LEGACY_WR_WB | Cached legacy write, CCA = Write Back (WB) |
| x04 | LEGACY_RD_WB | Cached legacy read, CCA = WB, WT |
| x05 | LEGACY_SYNC | Uncached legacy read with MReqInfo[3] == 1 |
| x06 | L2_L3_CACHEOP_WR | Uncached legacy write with MAddrSpace != 0 |
| x07 | L2_L3_CACHEOP_RD | Uncached legacy read with MAddrSpace!=0 |
| x08 | COH_RD_OWN | Coherent Read Own |
| x09 | COH_RD_SHR | Coherent Read Shared |
| x0A | COH_RD_DISCARD | Coherent Read Discard |
| x0B | COH_RD_SHR_ALWAYS | Coherent Read Share Always |
| 0x0C | COH_UPGRADE | Coherent Upgrade (SC bit = 0) |
| 0x0D | COH_WB | Coherent Writeback |
| 0x10 | COH_COPYBACK | Coherent Copyback |
| 0x11 | COH_COPYBACKINV | Coherent Copyback Invalidate |
| 0x12 | COH_INV | Coherent Invalidate |
| 0x13 | COH_WR_INV | Coherent Write Invalidate |
| 0x14 | COH_CMPL_SYNC | Coherent Completion Sync with MReqInfo[3] = 0 |
| 0x15 | COH_CMPL_SYNC_MEM | Coherent Completion Sync with MReqInfo[3] = 1 |
| 0x17 | COH_WR_INV_FULL | Coherent Invalidate due to a full line |
| 0x18 | COH_RD_OWN_SC | Coherent Read own with SC bit = 1 |
| 0x1C | COH_UPGRADE_SC | Coherent Upgrade with SC bit = 1 |

TABLE 3

Target of Current Request

| Value | Target | Value | Target |
|---|---|---|---|
| 0x0 | Memory/L2 with no speculation. L2 allocation bit = 0 | 0x1 | Memory/L2 with no speculation. L2 allocation bit = 1 |
| 0x2 | Memory/L2 with speculation. L2 allocation bit = 0 | 0x3 | Memory/L2 with speculation. L2 allocation bit = 1 |
| 0x4 | Global Control register (GCR) | 0x5 | GIC |
| 0x6 | Memory Mapped I/O (MMIO) | 0x7 | Reserved |

TABLE 4

Global Intervention State for Cache Line

| Value | State |
|---|---|
| 0x0 | Invalid |
| 0x1 | Shared |
| 0x2 | Modified |
| 0x3 | Exclusive |
| 0x4-0x7 | Reserved |

TABLE 5

Transaction Stall Reason

| Value | Cause | Value | Cause |
|---|---|---|---|
| 0x0 | No Stall | 0x1 | Awaiting Intervention from CPU(s) |
| 0x2 | IMQ Full | 0x3 | Intervention Write Data Buffer (IWDB) Full |
| 0x4 | TRSQ Full | 0x5 | Intervention Response Transaction Queue (IRTQ) Full |
| 0x6 | Waiting for IMQ empty on a sync | 0x7 | Stall due to PDtrace ™ architecture |

The following signals represent updates to the PDTrace™ architecture interface that allow interaction with the disclosed coherence manager. The Trace Control Block (TCB) registers are used to enable or disable coherence manager (CMP) traces as well as to enable/disable various available features. A new register TCBControlD is added to control various aspects of the trace output. The various bits used in TCBControlD are defined in Table 6. Bits 7 to 22 are reserved for implementation specific use.

TABLE 6

| 31 | 26 25 | 24 | 23 | 22 21 20 19 18 17 | 16 15 | 12 11 | 8 | 7 | 6 | 5 | 4 | 3 | 2 | 1 | 0 |
|---|---|---|---|---|---|---|---|---|---|---|---|---|---|---|---|
| Impl | P4_Ctl | | P3_Ctl | P2_Ctl | P1_Ctl | P0_Ctl | Reserved | TWS-reVal | WB | 0 | IO | TLev | AE | Core_CM_En | CM_En |

TABLE 7

TCBCONTROLD Register Field Description

| Name | Bits | Description | Read/Write | Reset State | Compliance |
|---|---|---|---|---|---|
| 0 | 31:26 | Reserved for implementations. Check core documentation | 0 | 0 | Required |
| P4_Ctl | 25:24 | Implementation specific finer grained control over tracing Port 4 traffic at the CM. See Table 1.9 | | | Impl. Dep |
| P3_Ctl | 23:22 | Implementation specific finer grained control over tracing Port 3 traffic at the CM. See Table 1.9 | | | Impl. Dep |
| P2_Ctl | 21:20 | Implementation specific finer grained control over tracing Port 2 traffic at the CM. See Table 1.9. | | | Impl. Dep |
| P1_Ctl | 19:18 | Implementation specific finer grained control over tracing Port 1 traffic at the CM. See Table 1.9 | | | Impl. Dep |
| P0_Ctl | 17:16 | Implementation specific finer grained control over tracing Port 0 traffic at the CM. See Table 1.9. | | | Impl. Dep |
| Reserved | 15:12 | Reserved for future use. Must be written as 0, and read as 0 | 0 | 0 | Required |
| TWSrcVal | 11:8 | The source ID of the CM. | 0 | 0 | Required |
| WB | 7 | When this bit is set, Coherent Writeback requests are traced. If this hit is not set, all Coherent Writeback requests are suppressed from the CM trace stream | R/W | 0 | Required |
| Reserved | 6 | Reserved for future use. Must be written as 0, and read as 0 | 0 | 0 | Required |
| IO | 5 | Inhibit Overflow on CM FIFO full condition. Will stall the CM until forward progress can be made | R/W | Undefined | Required |
| TLev | 4:3 | This defines the current trace level being used by CM tracing<br>Encoding   Meaning<br>00   No Timing Information<br>01   Include Stall Times, Causes<br>10   Reserved<br>11   Reserved | R/W | Undefined | Required |
| AE | 2 | When set to 1, address tracing is always enabled for the CM. This affects trace output from the serialization unit of the CM. When set to 0, address tracing may be enabled through the implementation specific P[x]_Ctl bits | R/W | 0 | Required |
| Core_CM_En | 1 | Each core can enable or disable CM tracing using this bit. This bit is not routed through the master core, but is individually controlled by each core. Setting this bit can enable tracing from the CM even if tracing is being controlled through software, if all other enabling functions are true. | R/W | 0 | Required |
| CM_EN | 0 | This is the master trace enable switch to the CM. When zero tracing from the CM is always disabled. When set to one, tracing is enabled if other enabling functions are true. | R/W | 0 | Required |

Observe that the PX_Ctl fields allow the coherence manager to trace a different of information for each port. For example, for the port connected to the IOCU 304, it is beneficial to trace the address because there is no other tracing in the ICOU 304. However, for ports connected to a processor, the address may not be as useful since it is already traced by the processor.

TABLE 8

Core/IOU specific trace control bits

| Value | Meaning |
|---|---|
| 00 | Tracing Enabled, No Address Tracing |
| 01 | Tracing Enabled, Address Tracing Enabled |

TABLE 8-continued

Core/IOU specific trace control bits

| Value | Meaning |
|---|---|
| 10 | Reserved |
| 11 | Tracing Disabled |

Table 8 illustrates values to support flexibility in the amount of information being traced. The architecture enables implementations to enable and disable trace features per input port of the coherence manager.

Since each core in the system has its own set of TCBControl registers, one core is made the 'master' core that controls trace functionality for the coherence manager (CM). This can be done using a CMP GCR to designate a core as the master trace control for the CM. This control register is located in the global debug block within the GCR address space of the CM, at offset 0x0000. The format of the register is given below in Table 9.

TABLE 9

The PDtrace Architecture Control Configuration Register

| Name | Bits | Description | Read/Write | Reset State | Compliance |
|---|---|---|---|---|---|
| 0 | 31-5 | Reserved for future use. Must be written as zero; returns zero on read. | R | 0 | Required |
| TS | 4 | The trace select bit is used to select between the hardware and the software trace control bits. A value of zero selects the external hardware trace block signals, and a value of one selects the trace control bits in the CMTraceControl register | R/W | 0 | Required |
| CoreID | 3:0 | ID of core that controls configuration for the coherent subsystem | R/W | 0 | Required |

Software control is enabled through the CMTraceControl register in the GCR register space (Debug Control Block, offset 0x0010). This register is very similar to TCBControlD, and is described below.

TABLE 10

CMTraceControl Register Format

| 31 | 26 25 | 24 | 23 | 22 | 21 | 20 | 19 | 18 17 | 16 | 15 | 12 | 11 | 8 | 7 | 6 | 5 | 4 | 3 | 2 | 1 | 0 |
|---|---|---|---|---|---|---|---|---|---|---|---|---|---|---|---|---|---|---|---|---|---|
| Impl | P4_Ctl | | P3_Ctl | | P2_Ctl | | P1_Ctl | | P0_Ctl | Reserved | | TWSreVal | | WB | 0 | IO | TLev | | AE | SW_Trace_ON | CM_En |

TABLE 11

CMTraceControl Register Field Descriptions

| Fields Name | Bits | Description | Read/Write | Reset State | Compliance |
|---|---|---|---|---|---|
| 0 | 31:26 | Reserved for implementations. Check core documentation | 0 | 0 | Required |
| P4_Ctl | 25:24 | Implementation specific finer grained control over tracing Port 4 traffic at the CM. See Table 1.9 | | | Impl. Dep |
| P3_Ctl | 23:22 | Implementation specific finer grained control over tracing Port 3 traffic at the CM. See Table 1.9 | | | Impl. Dep |
| P2_Ctl | 21:20 | Implementation specific finer grained control over tracing Port 2 traffic at the CM. See Table 1.9. | | | Impl. Dep |
| P1_Ctl | 19:18 | Implementation specific finer grained control over tracing Port 1 traffic at the CM. See Table 1.9 | | | Impl. Dep |
| P0_Ctl | 17:16 | Implementation specific finer grained control over tracing Port 0 traffic at the CM. See Table 1.9 | | | Impl. Dep |
| Reserved | 15:13 | Reserved for future use. Must be written as 0, and read as 0 | 0 | 0 | Required |
| TF8_Present | 12 | If set to 1, the TF8 trace format exists and will be used to trace load/store hit/miss information, as well as the CoherentSyncID. If set to 0, each existing trace format is augmented to include load/store hit/miss indication. See Section 1.1.7 for more details | R | Preset | Required |

TABLE 11-continued

CMTraceControl Register Field Descriptions

| Fields Name | Bits | Description | Read/Write | Reset State | Compliance |
|---|---|---|---|---|---|
| TWSrcVal | 11:8 | The source ID of the CM. | 0 | 0 | Required |
| WB | 7 | When this bit is set, Coherent Writeback requests are traced. If this hit is not set, all Coherent Writeback requests are suppressed from the CM trace steam | R/W | 0 | Required |
| Reserved | 6 | Reserved for future use. Must be written as 0, and read as 0 | 0 | 0 | Required |
| IO | 5 | Inhibit Overflow on CM FIFO full condition. Will stall the CM until forward progress can be made | R/W | Undefined | Required |
| TLev | 4:3 | This defines the current trace level being used by CM tracing<br>Encoding  Meaning<br>00  No Timing Information<br>01  Include Stall Times, Causes<br>10  Reserved<br>11  Reserved | R/W | Undefined | Required |
| AE | 2 | When set to 1, address tracing is always enabled for the CM. This affects trace output from the serialization unit of the CM. When set to 0, address tracing may be enabled through the implementation specific P[x]_Ctl bits | R/W | 0 | Required |
| SW_Trace_ON | 1 | Setting this bit to 1 enables tracing from the CM as long as the CM_EN bit is also enabled. | R/W | 0 | Required |
| CM_EN | 0 | This is the master trace enable switch to the CM. When zero tracing from the CM is always disabled. When set to one, tracing is enabled if other enabling functions are true. | R/W | 0 | Required |

The PDtrace™ architecture requires some information to be traced out from each core to allow correlation between requests from the core with transactions at the coherence manager. The information required includes the coherent synchronization ID. The exact implementation of how this information is made available is highly dependent on the particular core on which it is implemented.

One embodiment of the invention expands PDTrace™ architecture trace formats TF2, TF3, and TF4. Each of these formats is expanded by one to four bits. Each instruction that is capable of generating a bus request ("LSU" instruction) adds at least two bits. All non-LSU instructions add a single bit (0) to the end of the trace formats. An LSU instruction that hits in the cache adds two bits "10". If the instruction misses in the cache, it adds four bits-11XY where XY represent the COSId. The hit/miss/COSId information for an LSU instruction is sent after the instruction completion message for that instruction has been sent. Specifically, it is attached to the second LSU instruction after the original instruction. For some architectures, this guarantees that the hit/miss information is available at the time it needs to be sent out.

A second mechanism introduces three variants of a new CPU trace format (TF8). A TF8 message is output on any memory operation that misses in the cache. The format is shown in Table 12A.

TABLE 12A

CPU Trace Format 8 (TF8)

| 15 | | 8 | 7 | 6 | 5 | 4 | 3 | 2 | 1 | 0 |
|---|---|---|---|---|---|---|---|---|---|---|
| HitCount | | | COSId | | 1 | 0 | 0 | 0 | 0 | 0 |

As previously discussed, trace data can have two sources within the coherence manager—the serialization response handler (SRH) or the Intervention Unit (IVU). The SRH uses two trace formats (CM_TF1, CM_TF2), and the IVU uses one format (CM_TF3). One trace format (CM_TF4) is used to indicate that overflow has occurred. Since overflow implies that trace messages have been lost, the system must be resynchronized. The first one to four bits of a trace word can be used to determine the packet type.

Different SRH trace formats are selected based upon the type of debugging one wants to perform. For example, more information is traced for hardware debugging compared to software debugging. The SRH produces trace metrics including a source processor, a serialized command, stall information, the address of the request being traced, and a target address. One or more of these metrics may be arranged in various formats. When request addresses are not being traced, the CM_TF1 trace format, shown in Tables 12 and 13 is used. If the TLev field in TCBControlD (or CMTraceControl) is set to 1, each packet also includes the SRH_WaitTime field, as shown in Table 13. The packet width varies from 14 bits (trace level 0; Table 12) to 22 bits (trace level 1; Table 13). Trace reconstruction software determines the total packet length by examining the appropriate control bits in TCBControlD or the CMTraceControl register.

TABLE 12B

CM Trace Format 1 (CM_TF1) - Trace Level 0

| 13 | 11 10 | 6 5 | 4 3 | 1 | 0 |
|---|---|---|---|---|---|
| AddrTarg | MCmd | COSId | SrcPort | 1 |

TABLE 13

CM Trace Format 1 (CM_TF1) Trace Level 1

| 21 | 14 13 | 11 10 | 6 5 | 4 3 | 1 | 0 |
|---|---|---|---|---|---|---|
| WaitTime | AddrTarg | MCmd | COSId | SrcPort | 1 |

When request addresses are being traced, the CM_TF2 trace format, shown in Tables 14 and 15 are used. Since each core sets the lowest three address bits to zero, only address bits [31:3] are traced. If the TLev field in TCBControlD (or CMTraceControl) is set to 1, each packet also includes the SRH_WaitTime field. The packet width varies from 45 bits (trace level 0; Table 14) to 53 bits (trace level 1; Table 15). Trace reconstruction software determines the total packet length by examining the appropriate control bits in TCBControlD or the CMTraceControl register.

TABLE 14

CM Trace Format 2 (CM_TF2) - Trace Level 0

| 44 | 16 15 | 13 12 | 8 7 | 6 5 | 3 2 | 1 | 0 |
|---|---|---|---|---|---|---|---|
| Address[31:3] | AddrTarg | MCmd | COSId | SrcPort | 1 | 0 | 0 |

TABLE 15

CM Trace Format 2 (CM_TF2) - Trace Level 1

| 52 | 45 44 | 16 15 | 13 12 | 8 7 | 6 5 | 3 2 | 1 | 0 |
|---|---|---|---|---|---|---|---|---|
| WaitTime | Address[31:3] | AddrTarg | MCmd | COSId | SrcPort | 1 | 0 | 0 |

The IVU produces trace metrics including a source processor, a bit vector of intervention port responses, global intervention state for a cache line, a transaction cancelled indicator, an indication that an intervention will cause a cancelled store condition to fail, an indication that an intervention will cause a future store condition to fail, transaction delay information, and stall cause information. One or more of these metrics may be arranged in various formats. Trace data from the IVU uses the CM_TF3 trace format, shown in Tables 16 and 17. If the trace level (TLev in TCBControlD or CMTraceControl) is set to 1, each packet also includes two additional fields (WaitTime and StallCause). Each packet is 18 bits (trace level 0; Table 16) or 29 bits (trace level 1; Table 17). The SCF field indicates if a Store Conditional Failed, and the SCC field indicates if a Store Conditional was cancelled. Trace reconstruction software determines the trace level being used by examining the TCBControlD register or the CMTraceControl register.

mal level of information about CPU requests that reaches the coherence manager (e.g. information about sharing, global cache line state, etc.), but excludes information about stalls and does not include the address. The trace formats in this case may be those of Tables 12 and 16.

If the system is bandwidth limited, but the user is interested in performance debugging, the trace level may be set to 1 with disabled address tracing. This provides some additional information about stalls. The trace formats in these instance may be those of Tables 13 and 17.

If the coherence manager inhibit overflow bit (CM_IO) is not set, it is possible for trace packets to be lost if internal trace buffers are filled. The coherence manager indicates trace buffer overflow by outputting a CM_TF4 packet. Regular packets resume after the CM_TF4 packet. The coherence manager resynchronizes with all cores by requesting a new COSId. Table 18 illustrates the overflow format.

TABLE 16

CM Trace Format 3 (CM_TF3) with Trace Level 0

| 17 | 16 | 15 | 13 | 12 | 7 | 6 | 5 | 4 | 2 | 1 | 0 |
|---|---|---|---|---|---|---|---|---|---|---|---|
| SCC | SCF | IntvResult | | RespBV | | COSId | | SrcPort | | 1 | 0 |

TABLE 17

CM Trace Format 3 (CM_TF3) with Trace Level 1

| 28 | 26 | 25 | 18 | 17 | 16 | 15 | 13 | 12 | 7 | 6 | 5 | 4 | 2 | 1 | 0 |
|---|---|---|---|---|---|---|---|---|---|---|---|---|---|---|---|
| StallCause | | WaitTime | | SCC | SCF | IntvResult | | RespBV | | COSId | | SrcPort | | 1 | 0 |

Various formats can be selected based upon the circumstances. For example, if bandwidth is plentiful and/or one wants maximum information, the trace level may be set to 1 and address tracing may be enabled. This provides information about why certain stalls occur and how long they are (trace level 1). This also provides an additional level of correlation between addresses seen at the CPU and addresses seen at the coherence manager. The trace formats of Tables 15 and 17 may be used in these circumstances.

TABLE 18

Overflow Format

| | 3 | 2 | 1 | 0 |
|---|---|---|---|---|
| | 1 | 0 | 0 | 0 |

If the system is bandwidth limited and/or the user is only interested in software debugging, trace level 0 may be selected with address tracing disabled. This provides a mini- The PDtrace architecture defines mechanisms that allow hardware breakpoints to start (or stop) tracing. An embodiment of the invention extends these mechanisms to allow the triggering of trace from the Coherence Manager. Each breakpoint trigger within the TraceIBPC and TraceDBPC registers can also be set to start tracing from the core and coherence manager. If a trigger that is set to enable coherence manager tracing is fired, the corresponding Core_CM_EN bit in TCB-ControlD is set to one. Similarly, if a trigger that is set to disable tracing fires on a core, the Core_CM_EN bit is set to zero. The TraceIBPC and TraceDBPC registers are shown below. Tables 19 through 23 show the new encodings that allow triggering of the coherence manager trace. The PDtrace architecture currently uses TF6 to indicate the staff/end of a trace due to a hardware breakpoint trigger. We define a new bit (bit 14 of TF6) within the TCinfo field in TF6 to indicate if the coherence manager will be affected by the current trigger.

TABLE 19

TraceIBPC Register Format

| 31 | 30 29 | 28 | 27 | 26  24 | 23  21 | 20  18 | 17  15 | 14  12 | 11  9 | 8  6 | 5  3 | 2  0 |
|---|---|---|---|---|---|---|---|---|---|---|---|---|
| MB | 0 | IE | ATE | IBPC$_8$ | IBPC$_7$ | IBPC$_6$ | IBPC$_5$ | IBPC$_4$ | IBPC$_3$ | IBPC$_2$ | IBPC$_1$ | IBPC$_0$ |

TABLE 20

TraceIBPC Register Field Descriptions

| Fields | | | Read/ | Reset | |
|---|---|---|---|---|---|
| Name | Bits | Description | Write | State | Compliance |
| MB | 31 | Indicates that more instruction hardware breakpoints are present and register TraceIBPC2 should be used. | R | 0/1 | Required |
| 0 | 30:29 | Reserved. Reads as zero, and non-writable | R | 0 | Required |
| IE | 28 | Used to specify whether the trigger signal from EJTAG instruction breakpoint should trigger tracing functions or not: 0: disable trigger signals from instruction breakpoints 1: enables trigger signals from instruction breakpoints | R/W | 0 | Required |
| ATE | 27 | Additional trigger enable signal. Used to specify whether the additional trigger controls such as ARM, DISARM, and data-qualified tracing introduced in PDTrace ™ architecture revision 4.00 are implemented or not. | R | Preset | Required |
| IBPCn | 3n-1:3n-3 | The three bits are decoded to enable different tracing modes. Table 1.14 shows the possible interpretations. Each set of 3 bits represents the encoding for the instruction breakpoint n in the EJTAG implementation, if it exists. If the breakpoint does not exist then the bits are reserved, read as zero and writes are ignored. If ATE is zero, bits 3n-1:3n-2 are ignored, and only the bottom bit 3n-3 is used to start and stop tracing as specified in versions less than 4.00 of this specification. | R/W | 0 | LSB required, Upper two bits are Optional. Required for breakpoints implemented in EJTAG |

TABLE 21

TraceDBPC Register Format

| 31 | 30 29 | 28 | 27 | 26  24 | 23  21 | 20  18 | 17  15 | 14  12 | 11  9 | 8  6 | 5  3 | 2  0 |
|---|---|---|---|---|---|---|---|---|---|---|---|---|
| MB | 0 | DE | ATE | DBPC$_8$ | DBPC$_7$ | DBPC$_6$ | DBPC$_5$ | DBPC$_4$ | DBPC$_3$ | DBPC$_2$ | DBPC$_1$ | DBPC$_0$ |

TABLE 22

TraceDBPC Register Field

| Name | Bits | Description | Read/Write | Reset State | Compliance |
|---|---|---|---|---|---|
| MB | 31 | Indicates that more instruction hardware breakpoints are present and register TraceIBPC2 should be used. | R | 0/1 | Required |
| 0 | 30:29 | Reserved. Reads as zero, and non-writable | R | 0 | Required |
| DE | 28 | Used to specify whether the trigger signal from EJTAG instruction breakpoint should trigger tracing functions or not: 0: disable trigger signals from data breakpoints 1: enables trigger signals from data breakpoints | R/W | 0 | Required |
| ATE | 27 | Additional trigger enable signal. Used to specify whether the additional trigger controls such as ARM, DISARM, and data-qualified tracing introduced in PDTrace ™ architecture revision 4.00 are implemented or not. | R | Preset | Required |
| DBPCn | 3n-1:3n-3 | The three bits are decoded to enable different tracing modes. Table 1.14 shows the possible interpretations. Each set of 3 bits represents the encoding for the instruction breakpoint n in the EJTAG implementation, if it exists. If the breakpoint does not exist then the bits are reserved, read as zero and writes are ignored. If ATE is zero, bits 3n-1:3n-2 are ignored, and only the bottom bit 3n-3 is used to start and stop tracing as specified in versions less than 4.00 of this specification. | R/W | 0 | LSB required, Upper two bits are Optional. Required for breakpoints implemented in EJTAG |

TABLE 23

BreakPoint Control Modes: IBPC and DBPC

| Value | Trigger Action | Description |
|---|---|---|
| 000 | Unconditional Trace Stop | Unconditionally stop tracing if tracing was turned on. If tracing is already off, then there is no effect. |
| 001 | Unconditional Trace Start | Unconditionally start tracing if tracing was turned off. If tracing is already turned off then there is no effect. |
| 010 | [Old values will be deprecated] | [Unused] |
| 011 | Unconditional Trace Start (from CM and Core) | Unconditionally start tracing if tracing was turned off. If tracing is already turned off then there is no effect. |
| 100 | [Old values will be deprecated] | Unused |
| 101 | [Old values will be deprecated] | |
| 110 | [Old values will be deprecated] | |
| 111 | [Old values will be deprecated] | |

Trace Format 6 (TF6) shown in Table 24 is provided to the coherence manager trace control block (TCB) to transmit information that does not directly originate from the cycle by cycle trace data on the PDtrace™ architecture interface. That is, TF6 can be used by the TCB to store any information it wants in the trace memory, within the constraints of the specified format. This information can then be used by software for any purpose. For example, TF6 can be used to indicate a special condition, trigger, semaphore, breakpoint, or break in tracing that is encountered by the TCB.

TABLE 24

TF6 (Trace Format 6)

| 15 ... 8 | 7 ... 4 | 3 | 2 | 1 | 0 |
|---|---|---|---|---|---|
| TCBinfo | TCBcode | 0 | 1 | 0 | 0 |

The definition of TCBcode and TCBinfo is shown in Table 25.

TABLE 25

TCBcode and TCBinfo fields of Trace Format 6 (TF6)

| TCBcode | Description | TCBinfo |
|---|---|---|
| 0000 | Trigger Start: Identifies start-point of trace. TCBinfo identifies what caused the trigger. | Cause of trigger. Taken from the Trigger control register generating this trigger. |
| 0100 | Trigger End: Identifies end-point of trace. TCBinfo identifies what caused the trigger. | |
| 1000 | Trigger Center: Identifies center-point of trace. TCBinfo identifies what caused the trigger. | |

TABLE 25-continued

TCBcode and TCBinfo fields of Trace Format 6 (TF6)

| TCBcode | Description | TCBinfo |
|---|---|---|
| 1100 | Trigger Info: Information-point in trace. TCBinfo identifies what caused the trigger. | |
| 0001 | No trace cycles: Number of cycles where the processor is not sending trace data (PDO_IamTracing is deasserted), but a stall is not requested by the TCB (PDI_StallSending is not asserted). This can happen when the processor, during its execution, switches modes internally that take it from a trace output required region to one where trace output was not requested. For example, if it was required to trace in User-mode but not in Kernel-mode, then when the processor jumps to Kernel-mode from User-mode, the internal PDtrace ™ architecture FIFO is emptied, then the processor deasserts PDO_IamTracing and stops sending trace information. In order to maintain an accurate account of total execution cycles, the number of such no-trace cycles have to be tracked and counted. This TCBcode achieves this goal. | Number of cycles (All zeros is equal to 256). If more than 256 is needed, the TF6 format is repeated. |
| 0101 | Back stall cycles: Number of cycles when PDI_StallSending was asserted, preventing the PDtrace ™ architecture interface from transmitting any trace information. | |
| 1001 | Instruction or Data Hardware Breakpoint Trigger: Indicates that one or more of the instruction or data breakpoints were signalled and caused a trace trigger. Bit 8 of the TCBinfo field indicates whether it was an instruction (0) or data (1) breakpoint that caused the trigger. Bit 9 indicates whether or not trace was turned off (0) or on (1) by this trigger. Bits 13:10 encodes the hardware breakpoint number. Bit 14 indicates if tracing from the coherence manager was affected (1) or not (0). When tracing is turned off, a TF6 will be the last format that appears in the trace memory for that tracing sequence. The next trace record should be another TF6 that indicated a trigger on signal. It is important to note that a trigger that turns on tracing when tracing is already on will not necessarily get traced out, and is optional depending on whether or not there is a free slot available during tracing. Similarly, when tracing is turned off, then a trigger that turns off tracing will not necessarily appear in trace memory. | Values are as described. |
| 1101 0010, 0110, 1010 | Reserved for future use | Undefined |
| 1110 | Used for processors implementing MIPS MT ASE, see format TF7 | TC value |
| Xx11 | TCB implementation dependent | Implementation dependent |

Revision 4.0 (and higher) of the PDtdrace specification uses two of the TCBcode fields to indicate that Instruction or Data Hardware Breakpoints were caused by the instruction in the trace format immediately preceding this TF6 format. Whether the trigger caused by the breakpoint turned trace off or on is indicated by the appropriate TCBinfo field value. Note that if the processor is tracing and trace is turned off this would be passed on to the external trace memory appropriately. If the processor is not tracing, and trace is turned on by a hardware breakpoint, then this record would show up in trace memory as the first instruction to be traced (it is also the one that triggered trace on). If tracing is on-going and other triggers continue to keep turning on trace, then this would show up as a TF6 in trace memory.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g. within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing the apparatus described herein by providing software describing the apparatus. For example, software may describe multiple processors, the coherence manager, etc.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A non-transitory computer readable storage medium with executable instructions to characterize a coherency controller, comprising executable instructions to define:
   ports to receive processor trace information from a plurality of processors, wherein the processor trace information from each processor includes a processor identity and a condensed coherence indicator derived as a function of a processor synchronization signal and a shared memory miss signal, wherein processor synchronization signals define synchronization frames, wherein within a single synchronization frame with multiple memory miss signals, the condensed coherence indicator is incremented only once per synchronization frame, in response to the first memory miss signal of the multiple memory miss signals; and
   circuitry to produce a trace stream with trace metrics and condensed coherence indicators.

2. The non-transitory computer readable storage medium of claim 1 wherein the circuitry includes a serialized request handler to provide global transaction ordering of the trace information, wherein the serialized request handler distinguishes coherent memory requests from non-coherent memory requests.

3. The non-transitory computer readable storage medium of claim 2 wherein the serialized request handler produces trace metrics including a source processor.

4. The non-transitory computer readable storage medium of claim 2 wherein the serialized request handler produces trace metrics including a serialized command.

5. The non-transitory computer readable storage medium of claim 2 wherein the serialized request handler produces trace metrics including stall information.

6. The non-transitory computer readable storage medium of claim 2 wherein the serialized request handler produces trace metrics including the address of a request being traced.

7. The non-transitory computer readable storage medium of claim 2 wherein the serialized request handler produces trace metrics including a target address.

8. The non-transitory computer readable storage medium of claim 2 wherein the serialized request handler produces trace metrics in a format specifying a source processor, a coherence indicator, a command and an address target.

9. The non-transitory computer readable storage medium of claim 2 wherein the serialized request handler produces trace metrics in a format specifying a source processor, a coherence indicator, a command, an address target, and a serialize request handler wait time.

10. The non-transitory computer readable storage medium of claim 2 wherein the serialized request handler produces trace metrics in a format specifying a source processor, a coherence indicator, a command, an address target and a request address.

11. The non-transitory computer readable storage medium of claim 2 wherein the serialized request handler produces trace metrics in a format specifying a source processor, a coherence indicator, a command, an address target, a request address and a serialize request handler wait time.

12. The non-transitory computer readable storage medium of claim 1 wherein the circuitry includes an intervention unit to send coherent memory requests to the plurality of processors, receive coherent memory responses from the plurality of processors and generate intervention unit trace metrics including a coherence indicator, wherein the intervention unit receives the coherent memory requests from a serialized request handler that distinguishes coherent memory requests from non-coherent memory requests.

13. The non-transitory computer readable storage medium of claim 12 wherein the intervention unit produces trace intervention unit trace metrics including a source processor.

14. The non-transitory computer readable storage medium of claim 12 wherein the intervention unit produces trace intervention unit trace metrics including a bit vector of intervention port responses.

15. The non-transitory computer readable storage medium of claim 12 wherein the intervention unit produces trace intervention unit trace metrics including a global intervention state for a cache line.

16. The non-transitory computer readable storage medium of claim 12 wherein the intervention unit produces trace intervention unit trace metrics including a transaction cancelled indicator.

17. The non-transitory computer readable storage medium of claim 12 wherein the intervention unit produces trace intervention unit trace metrics indicating that an intervention will cause a cancelled store condition to fail.

18. The non-transitory computer readable storage medium of claim 12 wherein the intervention unit produces trace intervention unit trace metrics indicating that an intervention will cause a future store condition to fail.

19. The non-transitory computer readable storage medium of claim 12 wherein the intervention unit produces trace intervention unit trace metrics including transaction delay information.

20. The non-transitory computer readable storage medium of claim 12 wherein the intervention unit produces trace intervention unit trace metrics including stall cause information.

21. The non-transitory computer readable storage medium of claim 12 wherein the intervention unit produces intervention unit trace metrics in a format specifying a source processor, a coherence indicator, a vector of intervention port responses, a global intervention cache line state, a source condition failure command, and a previous source condition failure indication.

22. The non-transitory computer readable storage medium of claim 12 wherein the intervention unit produces intervention unit trace metrics in a format specifying a source processor, a coherence indicator, a vector of intervention port responses, a global intervention cache line state, a source condition failure command, a previous source condition failure indication, an intervention unit wait time, and a stall cause indicator.

23. The non-transitory computer readable storage medium of claim 1 wherein the circuitry selectively generates a trace buffer overflow indicator.

24. The non-transitory computer readable storage medium of claim 1 wherein the circuitry supports hardware trace breakpoints.

25. The non-transitory computer readable storage medium of claim 1 wherein the circuitry supports the storage of selective trace information in trace memory.

26. The non-transitory computer readable storage medium of claim 25 wherein the selective trace information is selected from a special condition, a trigger, a breakpoint and a trace control block break in tracing.

* * * * *